United States Patent
Fukuzako et al.

(10) Patent No.: US 8,631,677 B2
(45) Date of Patent: Jan. 21, 2014

(54) PRODUCTION METHOD OF ROTATING DEVICE HAVING THRUST DYNAMIC PRESSURE GENERATING SITE ON WHICH A THRUST PRESSURE PATTERN IS FORMED AND ROTATING DEVICE PRODUCED BY SAID PRODUCTION METHOD

(75) Inventors: Yasuo Fukuzako, Shizuoka (JP); Hiroshi Iwai, Shizuoka (JP)

(73) Assignee: Samsung Electro-Mechanics Japan Advanced Technology Co., Ltd., Shizuoka (JP)

( * ) Notice: Subject to any disclaimer, the term of this patent is extended or adjusted under 35 U.S.C. 154(b) by 589 days.

(21) Appl. No.: 12/979,268

(22) Filed: Dec. 27, 2010

(65) Prior Publication Data

US 2011/0154875 A1    Jun. 30, 2011

(30) Foreign Application Priority Data

Dec. 28, 2009  (WO) ................ PCT/JP2009/007325
May 27, 2010  (JP) ............................. 2010-121575

(51) Int. Cl.
  *B21J 9/18*  (2006.01)
(52) U.S. Cl.
  USPC ............... 72/453.02; 72/67; 72/352; 72/412; 29/898.02; 29/898.057
(58) Field of Classification Search
  USPC ............. 72/67, 112, 343, 352, 380, 386, 412, 72/441, 446, 447, 453.01, 453.02, 455, 72/470; 29/898.02, 898.041

See application file for complete search history.

(56) References Cited

U.S. PATENT DOCUMENTS

| | | | | |
|---|---|---|---|---|
| 5,592,847 | A  * | 1/1997 | Sarkisian et al. | ............... 72/356 |
| 5,787,579 | A  * | 8/1998 | Takahashi et al. | ........ 29/898.057 |
| 6,216,508 | B1 * | 4/2001 | Matsubara et al. | ................ 72/43 |
| 6,240,765 | B1 * | 6/2001 | Delgado et al. | ................ 72/356 |
| 7,523,635 | B2 * | 4/2009 | Ono | ............................... 72/356 |
| 8,381,404 | B2 * | 2/2013 | Aoshima et al. | ........... 29/898.13 |

FOREIGN PATENT DOCUMENTS

| | | | | |
|---|---|---|---|---|
| JP | 63-36945 | * | 2/1988 | ................ B21J 5/02 |
| JP | 1-170527 | * | 7/1989 | ............ B21D 22/02 |
| JP | 2008-275074 | | 11/2008 | |

* cited by examiner

Primary Examiner — Edward Tolan
(74) Attorney, Agent, or Firm — Blank Rome LLP (57) ABSTRACT

A thrust dynamic pressure pattern is marked on a rotating member or fixed member set on a rest table. A pressure for marking is applied to a member to be marked in a cycle of applying and releasing the pressure, and a supplemental force for keeping the member to be marked, still is separately applied. According to the present embodiment, a rotating device can be provided that narrows down a bearing gap and improves the efficiency of raking up a lubricant so as to increase the dynamic pressure by reducing the deformation of the shape of the protrusions of a thrust dynamic pressure pattern and the variation in the height of the protrusions when forming the thrust dynamic pressure pattern in a method of producing a rotating device.

20 Claims, 4 Drawing Sheets

PRODUCTION METHOD OF ROTATING DEVICE HAVING THRUST DYNAMIC PRESSURE GENERATING SITE ON WHICH A THRUST PRESSURE PATTERN IS FORMED AND ROTATING DEVICE PRODUCED BY SAID PRODUCTION METHOD

CROSS-REFERENCE TO RELATED APPLICATION

This application is based upon and claims the benefit of priority from International application PCT/JP2009/007325, filed on Dec. 28, 2009 and Japanese Patent Application No. JP 2010-121575, filed on May 27, 2010, the entire content of which is incorporated herein by reference.

BACKGROUND OF THE INVENTION

1. Field of the Invention

The present invention relates to a production method of a rotating device and particularly to a production method of a rotating device, which improves the processing accuracy of a thrust dynamic pressure pattern and provides a rotating device with enhanced bearing stiffness, and to a rotating device produced by the method.

2. Description of the Related Art

There exists a rotating device such as a Hard Disk Drive (HDD) in which a fluid dynamic bearing unit, which allows for stable high-speed rotation, is mounted. An example of the structure of the fluid dynamic bearing unit is a fluid dynamic bearing unit provided with a thrust dynamic pressure generating site, with a space between a sleeve that forms a part of a fixed body and a thrust member that forms a part of a rotating body, the space being filled with lubricant. The thrust dynamic pressure generating site is provided with a thrust dynamic pressure pattern, obtained by forming an indentation of a predetermined shape on the surface of either the sleeve or the thrust member. The cross-sectional shape along the circumferential direction of the thrust dynamic pressure pattern is, for example, continuously folded-back, including indentations and protrusions therebetween. The fluid dynamic bearing allows for smooth and high-speed rotation by supporting the rotating body in a non-contact manner by the dynamic pressure generated in a part of the lubricant, by raking up the lubricant with the edges of the protrusions (for example, see patent document 1).

[Patent document 1] Japanese Laid-Open Publication No. 2008-275074

The stiffness of a fluid dynamic bearing is required to be further improved so that such a rotating device can be used for so-called mobile devices that are used in an environment subject to high vibration. Increasing the dynamic pressure of a thrust dynamic pressure generating site is effective for improving the stiffness. For this to be achieved, there are several options: narrowing down a gap between a sleeve and a thrust member; and forming the thrust dynamic pressure pattern to have a cross-sectional shape that allows for a lubricant to be more efficiently raked up. However, a thrust dynamic pressure pattern that is formed by plastic-working such as press-working has a deformed protrusion or may have protrusions of varying height.

When the height variation of the protrusions of the thrust dynamic pressure pattern is large, the area with the most height comes into contact with the opposite surface that the thrust dynamic pressure pattern faces when the gap between the opposite surface and the thrust dynamic pressure pattern is narrowed down, and the area with the most height is scraped due to contact with the opposite surface, which results in foreign particles. The existence of foreign particles in a bearing reduces the rotational accuracy. In the worst case scenario, a bearing malfunction, such as a burn-in, may be caused. Therefore, the gap between the thrust dynamic pressure pattern and the opposite surface cannot be greatly narrowed down. When the shape of the protrusion of the thrust dynamic pressure pattern is greatly deformed, a steep edge cannot be obtained, and the lubricant cannot be efficiently raked up. Therefore, the efficiency of dynamic pressure generation is low, and the stiffness of the bearing cannot be improved. In other words, a large deformation of the shape of the protrusion of the thrust dynamic pressure pattern and a large variation in the height of the protrusion prevents the stiffness of the bearing from being improved.

SUMMARY OF THE INVENTION

In this background, a purpose of the present invention is to provide a rotating device production method and a rotating device that narrows down a bearing gap and improves the efficiency of raking up a lubricant so as to increase the thrust dynamic pressure by reducing, in a method of producing a rotating device, the deformation of the shape of the protrusions of a thrust dynamic pressure pattern and the variation in the height of the protrusions when forming the thrust dynamic pressure pattern by plastic-working.

A production method of a rotating device according to one embodiment of the present invention has: a fixed body; a rotating body supported rotatably around a rotating axis; a fixed member fixed to the fixed body; a rotating member fixed to the rotating body so as to surround the rotating axis, facing the fixed member in the axial direction; and a thrust dynamic pressure generating site provided with a thrust dynamic pressure pattern formed on at least either a part of the end surface of the rotating member or a part of the end surface of the fixed member, which face the axial direction, wherein a manufacturing apparatus is used that is provided with, a rest table, a movable table supported such that the movable table can move up and down relative to the rest table, a driving device arranged on the movable table and configured to generate a pressing force, a supplemental-force providing means arranged on the movable table and configured to provide a supplemental force, separate from the pressing force, to the movable table, and a first die arranged in between the driving device and the rest table. The production method comprises: setting either the rotating member or the fixed member in the manufacturing apparatus as a member to be marked; bringing the member to be marked and the first die into contact with each other; forming the thrust dynamic pressure pattern gradually by consecutively repeating a cycle for a plurality of times, which includes a pressuring operation of marking a step portion on the member to be marked by applying the pressing force on the member to be marked through the first die and a releasing operation of releasing the pressing force thereafter; and incorporating the member to be marked in the rotating device.

The thrust dynamic pressure pattern is formed while applying the supplemental force, separate from the pressing force, that is small enough to prevent the shape of the member to be marked from being changed but large enough to maintain the state of contact of the first die with the member to be marked.

According to the present embodiment, a rotating device production method and a rotating device can be provided that narrows down a bearing gap and improves the efficiency of raking up a lubricant so as to increase the dynamic pressure by reducing the deformation of the shape of the protrusions of a thrust dynamic pressure pattern and the variation in the height of the protrusions when forming the thrust dynamic pressure pattern in a method of producing a rotating device.

The "rotating device" may be a device for driving a recording disk, for example, a brushless motor. The "rotating device" may also be a device, on which a recording disk is mounted, that rotationally drives the recording disk, for example, a Hard Disk Drive.

Optional combinations of the aforementioned constituting elements, and implementations of the invention in the form of methods, apparatuses, and systems, may also be practiced as additional modes of the present invention.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

The invention will now be described in reference to the preferred embodiments (hereinafter, referred to as embodiments). The same or equivalent constituting elements and members illustrated in each drawing shall be denoted by the same reference numerals, and duplicative explanations will be omitted appropriately. The dimensions of members illustrated in each drawing are appropriately enlarged or reduced for easier understanding. Some of members not important for describing the embodiments are omitted from each drawing.

Preferably, a rotating device produced by the production method of the embodiment is used as a Hard Disk Drive (often simply referred to as an HDD or a rotating device) on which a recording disk is mounted.

Figure 1:
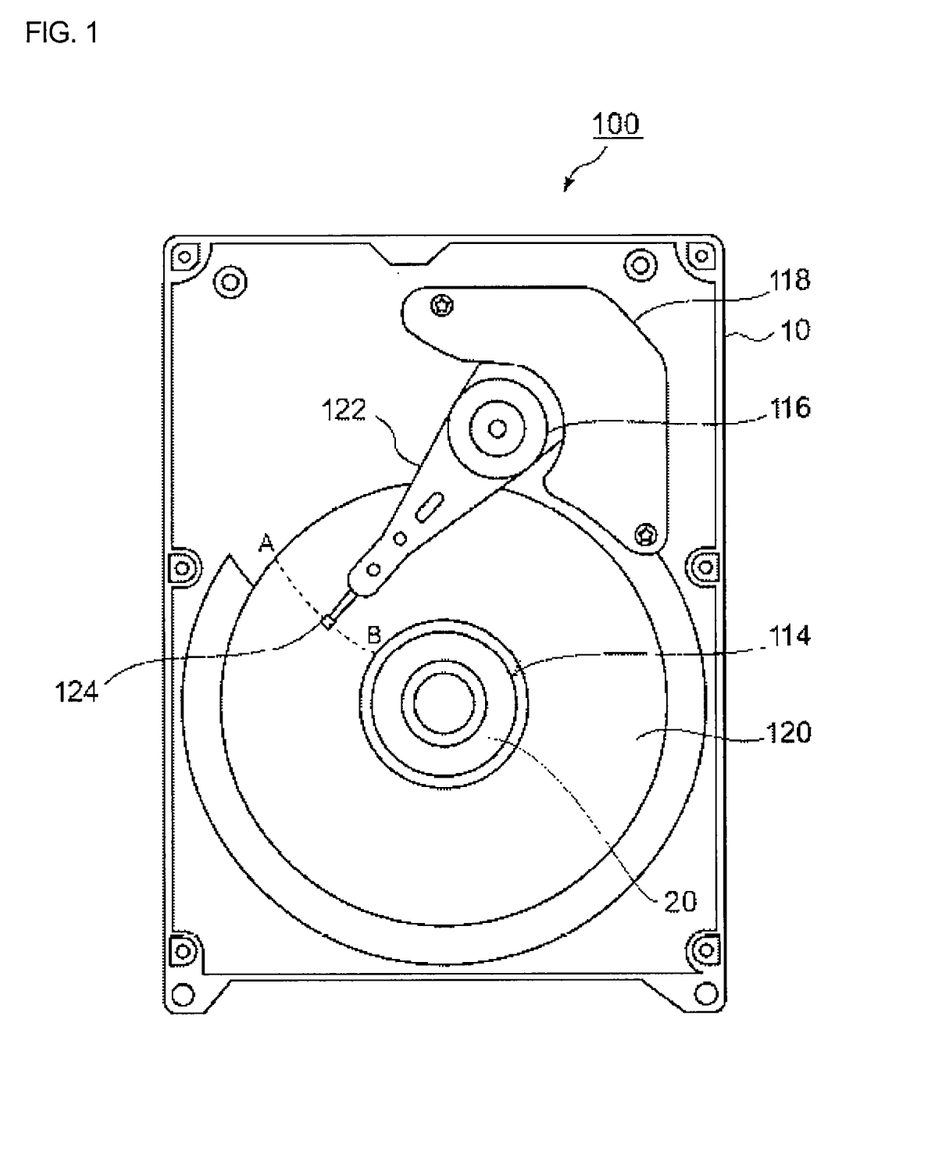
FIG. 1 is an illustrative view illustrating the internal structure of an HDD, which is an example of a rotating device produced by a production method of the present embodiment.

FIG. 1 is an illustrative view illustrating the internal structure of an HDD 100 (hereinafter, referred to as a rotating device 100), which is an example of the rotating device produced by the production method of the present embodiment. FIG. 1 shows the rotating device 100 without a cover so that the internal structure is exposed.

A brushless motor 114, an arm bearing unit 116, a voice coil motor 118, etc., are mounted on the upper surface of a base member 10. The brushless motor 114 supports, on a rotating axis, a hub 20 for mounting a recording disk 120. For example, the brushless motor 114 rotationally drives the recording disk 120 on which data can be recorded magnetically. For example, a spindle motor can be used as the brushless motor 114. The brushless motor 114 is driven by drive currents of three phases: U-phase, V-phase, and W-phase. The arm bearing unit 116 supports a swing arm 122 in such a manner that the swing arm 122 swings freely in a range of movement AB. The voice coil motor 118 swings the swing arm 122 in accordance with external control data. At the tip of the swing arm 122, a magnetic head 124 is provided. When the rotating device 100 is operating, the magnetic head 124 moves over the surface of the recording disk 120 with a slight gap in between, with the swing of the swing arm 122 in the range of movement AB, so as to read/write data. In FIG. 1, a point A corresponds to the position of the outermost recording track of the recording disk 120, and a point B corresponds to the position of the innermost recording track of the recording disk 120. The swing arm 122 may be moved to a waiting position provided on the side of the recording disk 120 when the rotating device 100 is in a resting state.

In the present embodiment, a rotating device or an HDD is described as including all the structures for reading/writing data such as the recording disk 120, the swing arm 122, the magnetic head 124, and the voice coil motor 118. Only the part that rotationally drives the recording disk 120 is sometimes described as a rotating device.

Figure 2:
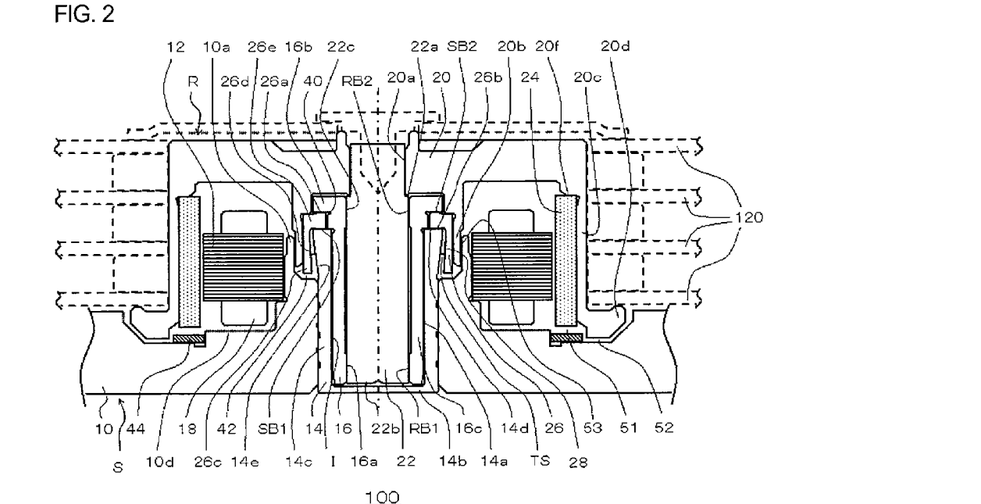
FIG. 2 is an essential-part cross-sectional view, along the axial direction of a shaft, of the rotating device of FIG. 1.

FIG. 2 is an essential-part cross-sectional view, along the axial direction of a shaft 22, of the rotating device 100. The rotating device 100 includes a fixed body S and a rotating body R. The fixed body S includes a base member 10, a stator core 12, a housing 14, and a sleeve 16. The rotating body R includes a hub 20, a shaft 22, and a thrust member 26. The base member 10 includes a cylindrical portion 10a; and the housing 14 includes a groove 14a, a bottom portion 14b, a cylindrical portion 14c, and a housing flat portion 14d. The sleeve 16 includes an inner circumferential surface 16a, a circular projecting portion 16b, and a cylindrical portion 16c, and a coil 18 is wound around the stator core 12. The hub 20 includes a central hole 20a, a cylindrical hanging portion 20b, an outer circumferential wall portion 20c, a hub outward-extension portion 20d, and a pedestal portion 20f. The shaft 22 includes a step portion 22a, a tip portion 22b, and an outer circumferential surface 22c; and the thrust member 26 includes a hanging portion 26c and a flange portion 26e. In the following descriptions, for convenience, the lower portion indicated in the drawings is represented as the bottom, and the upper portion as the top, as a whole.

The base member 10 has a central hole and the cylindrical portion 10a that is provided so as to surround the central hole. The base member 10 holds the housing 14 with the central hole and fixes the stator core 12 to the outer circumferential side of the cylindrical portion 10a that surrounds the housing 14. A second annular area 42 is formed between the outer circumferential side of the housing 14 and the inner circumferential side of the cylindrical portion 10a. The second annular area 42 has a shape that surrounds the central hole of the base member 10. The base member 10 is formed by cutting off an aluminum die cast material or by the press working of an aluminum sheet or a nickel-plated steel sheet.

The stator core 12 is formed, for example, by performing insulation coating such as electro-deposition coating or powder coating on the surface thereof after magnetic plates such as ferrosilicon plates are laminated. The stator core 12 can be formed by another method shown below. As a material of the stator core 12, a material having a high saturation magnetic flux density, for example, pure iron of 99 to 99.99 percent purity is processed to be iron powder. As a production method of the iron powder, a process such as, for example, an atomization method, a grinding method, a powder electrolysis method, a heat treatment method, a chemical reduction method, a plasma rotating electrode process, or a uniform droplet spray method can be applied to produce iron powder. The average particle diameter of the iron powder is ensured to be 0.02-0.5 mm. For example, an epoxy binder is mixed so as to provide an insulating film on the surface of the iron powder. The iron powder into which the binder is mixed is compression-molded with the use of a metallic mold and then calcined for 1-3 hours at 400-700 degrees Celsius. The bun at an edge portion is then removed by a rotating barrel, a vibration barrel, etc. The molded material is then washed with purified water and dried. Then, for example, each surface of the stator core 12 is coated with an epoxy resin by spray coating or the like, followed by, for example, 20-60 minutes of heating at 150-300 degrees Celsius. A necessary examination on, for example, the measurements or external appearance is then performed. In addition to the above method, as a method of forming an insulating film, a method of blending or spraying a silicone resin dissolved in an organic solvent and then removing the organic solvent after drying the silicone resin can be used.

The stator core 12 is ring-shaped so as to have a plurality of salient poles (not shown) that are protruding outwards from the ring portion, around each of which the coil 18 is wound. When the rotating device 100 is three-phase driven, the number of the salient poles is designed to be, for example, nine. The wiring terminal of the coil 18 is soldered on an FPC (Flexible Printed Circuits) arranged on the bottom surface of the base member 10. When a three-phase approximate sinusoidal current flows through the coil 18 via the FPC by a pre-set drive circuit, the coil 18 generates a rotating magnetic field at the salient poles of the stator core 12. The driving magnetic pole of the magnet 24 generates a rotational driving force by mutual interaction with the rotating magnetic field and rotates a rotating body R.

An attraction plate 44 is fixed on the base member 10 where the base member 10 faces, via a gap, the lower end surface of the ring-shaped magnet 24 in the axial direction. The attraction plate 44 forms a first narrow gap portion 51 in the area where the attraction plate 44 faces the magnet 24 in the axial direction. The attraction plate 44 is a ring member and is formed by pressing, for example, a cold-rolled steel plate or silicon steel plate, which is a soft magnetic material. The surface of the attraction plate 44 is, for example, treated with nickel plating for anti-corrosion purposes. The attraction plate 44 and the magnet 24 generate a magnetic attraction force in an axial direction between each other. In other words, the attraction plate 44 generates a hub attraction force, which draws the rotating body R toward the base member 10. It is ensured during the rotation of the rotating body R that the lifting force generated by a bearing structure including a radial dynamic pressure generating site RB and a thrust dynamic pressure generating site SB, which are described hereinafter, the hub attraction force, and the gravity applied to the entire rotating body R are in balance so that the rotating body R rotates in a non-contact manner with the surrounding members.

The housing 14 is fixed to the inner circumferential surface of the cylindrical portion 10a by adhesion or press-fitting. The housing 14 has an approximate cup shape in which the cylindrical portion 14c surrounding the sleeve 16, the housing flat portion 14d that is provided at the side end portion of the hub 20 and has a surface in the axial direction, and the bottom portion 14b that seals the end portion on the opposite side of the housing flat portion 14d among the cylindrical portion 14c, are joined together. The housing 14, having such a shape, is arranged so as to fill the lower end of the sleeve 16 and make the upper end thereof protrude. The bottom portion 14b and the cylindrical portion 14c may be integrally formed, or be formed as separate members and fixed to each other. In addition to a copper alloy, a sintered alloy by powder metallurgy, and a stainless steel, the housing 14 may be formed of a resin material such as polyetherimide, polyimide, or polyamide. When the housing 14 is formed by a resin material, the housing 14 is preferably configured with a resin material including, for example, a carbon fiber such that the specific resistance of the housing 14 is 106 ($\Omega \cdot m$) or less in order to secure the static electricity removal performance of the rotating device 100.

A groove 14a extending in the axial direction is formed on the inner circumferential surface of the housing 14. The groove 14a becomes a communication hole through which both end surface sides of the housing 14 communicate with each other, when fitting the sleeve 16 into the cylindrical portion 14c. The communication hole becomes the communication passage I with the lubricant 28 filling therein. With regard to the communication passage I, a description will follow. The cross-sectional shape of the groove 14a can be a recessed arc-shape or rectangular shape.

The sleeve 16 is fixed to the inner circumferential surface of the housing 14 by adhesion or press-fitting, and is fixed coaxially with the central hole of the base member 10. The sleeve 16 has, by storing the shaft 22, a shape in which the annular cylindrical portion 16c supports the shaft 22 and the circular projecting portion 16b, extending in the outer diameter direction at the side end portion of the hub 20 of the cylindrical portion 16c, which are joined together. The inner circumferential surface 16a of the cylindrical portion is formed inside the cylindrical portion 16c, and the inner circumferential surface 16a of the cylindrical portion surrounds the shaft 22. A radial space portion is formed between the inner circumferential surface 16a of the cylindrical portion of the sleeve 16 and the outer circumferential surface 22c of the shaft 22, and a first radial dynamic pressure generating site RB1 and a second radial dynamic pressure generating site RB2, which generate a radial dynamic pressure, are arranged in the radial space portion. The circular projecting portion 16b and the cylindrical portion 16c may be integrally formed or may be formed as separate members and fixed to each other. A first annular area 40 is formed between the circular projecting portion 16b and the cylindrical portion 14c. The sleeve 16 can be formed of a copper alloy, a sintered alloy by powder metallurgy, a stainless steel, etc. In addition to these materials, the sleeve 16 may be also formed of a resin material such as polyetherimide, polyimide, or polyamide. When a resin material is used to form the sleeve 16, the sleeve 16 is preferably configured with a resin material including, for example, a carbon fiber such that the specific resistance of the sleeve 16 is 106 ($\Omega \cdot m$) or less in order to secure the static electricity removal performance of the rotating device 100.

The hub 20 is configured to include the central hole 20a provided in the central portion thereof, the cylindrical hanging portion 20b provided so as to surround the central hole 20a, the outer circumferential wall portion 20c arranged outside the cylindrical hanging portion 20b, and the hub outward-extension portion 20d extending outwards in the radial direction of the hub 20 below the outer circumferential wall portion 20c. At the lower end surface of the outer circumferential wall portion 20c, a wall portion end surface 20g is provided, which forms a second narrow gap portion 52 facing the base member 10 in the axial direction. The hub 20 has an approximate cup shape. The hub 20 has a soft magnetic property. For example, a steel material such as SUS430F is used. The hub 20 is formed into a substantially cup-shaped form by, for example, the press working or cutting of a steel plate. For example, the stainless steel having a product name of DHS1, which is provided by Daido Steel Co., Ltd., produces small amount of out gas and is easy to be processed. For these reasons, the stainless steel is preferred as the material used for the hub 20. Similarly, the stainless steel having a product name of DHS2 is even more preferable as the material used for the hub 20 in that it has good corrosion resistance.

The thrust member 26 is fixed to the inner circumferential surface of the cylindrical hanging portion 20b of the hub 20, and the magnet 24 is fixed to the inner circumferential surface of the outer circumferential wall portion 20c. The magnet 24 is fixed to the annular portion concentric with the shaft 22 so as to face, in the radial direction, the salient poles of the stator core 12, which is fixed to the base member 10. With such a structure, the hub 20 is rotated integrally with the shaft 22 to drive the non-illustrated recording disk 120. The recording disk 120 is mounted on the hub outward-extension portion 20d such that the central hole thereof is engaged with the outer circumferential surface of the outer circumferential wall portion 20c.

The shaft 22 is fixed to the central hole 20a of the hub 20. Herein, the upper end portion of the shaft 22 is provided with the step portion 22a, and the shaft 22 is press-fitted into the central hole 20a when assembling. As a result, the hub 20 is restricted in the movement in the axial direction by the step portion 22a, and is integrated with the shaft 22 at a pre-set right angle. The tip portion 22b of the shaft 22 is stored in the inner circumference of the cylindrical portion 16c. The shaft 22 can be formed of a stainless material.

The thrust member 26 has a flange portion 26e surrounding the sleeve 16 and the hanging portion 26c surrounding the housing 14. The flange portion 26e is fixed to the interior wall of the cylindrical hanging portion 20b with an adhesive, and the hanging portion 26c is joined to the outer edge portion of the flange portion 26e and also fixed to the interior wall of the cylindrical hanging portion 20b with an adhesive. That is, the outer circumferential surface of the hanging portion 26c is fixed to the inner circumferential surface of the cylindrical hanging portion 20b with an adhesive. With such a structure, the flange portion 26e surrounds the outer circumference of the cylindrical portion 16c through a gap and is arranged on the lower surface of the circular projecting portion 16b thought a narrow gap. Further, the thrust member 26 is rotated integrally with the hub 20, and the flange portion 26e is rotated in the first area 40, and the hanging portion 26c is rotated in the second area 42, at the time.

As shown in FIG. 2, the flange portion 26e has a thrust upper surface 26a and a thrust lower surface 26b and has a shape that is thin in the axial direction. The hanging portion 26c extends in the axial direction on the lower surface of the outer circumference side of the flange portion 26e. The thrust lower surface 26b of the flange portion 26e and the housing flat portion 14d, which is the upper end portion of the housing 14, form a first thrust dynamic pressure generating site SB1, and the thrust upper surface 26a of the flange portion 26e and the lower surface of the circular projecting portion 16b form a second thrust dynamic pressure generating site SB2. The thrust member 26 joins the flange portion 26e and the hanging portion 26c together, and, as shown in FIG. 2, has a so-called inverted L-shaped cross section in which the alphabetical capital letter "L" is inverted upside down. The inner circumferential surface 26d of the hanging portion 26c has a tapered shape, the radius of which becomes gradually smaller toward the side opposite to the side on which the flange portion 26e is formed, and forms a capillary seal portion TS, which is described hereinafter. The thrust member 26 can be, for example, formed easily and inexpensively by press working or the like of a plate-like metallic material. Further, even when the thrust member 26 becomes thin and small in size, the thrust member 26 can still be manufactured so as to have good dimensional accuracy by press working or the like. As a result, such a shape contributes to the miniaturization and light weight of the rotating device 100.

The outer circumferential surface of the hanging portion 26c is fixed to the inner circumferential surface of the cylindrical hanging portion 20b with an adhesive. In addition to configuring the thrust dynamic pressure generating site, the thrust member 26 has a function of preventing the rotating body R from coming off the fixed body S. The thrust member 26 has a portion that overlaps the circular projecting portion 16b of the sleeve 16 in the radial direction and restricts the range of movement of the shaft in the axial direction. When the rotating body R and the fixed body S relatively move by impact, the flange portion 26e comes into contact with the lower surface of the circular projecting portion 16b. As a result, the thrust member 26 receives a stress in the direction in which the thrust member 26 is detached from the cylindrical hanging portion 20b. If the joint distance between the hanging portion 26c and the cylindrical hanging portion 20b is small, the joint strength becomes weak, causing a possibility that the joint therebetween may be destroyed by even a small impact to be high. That is, as the joint distance between the hanging portion 26c and the cylindrical hanging portion 20b becomes longer, the joint therebetween becomes stronger against impact.

The magnet 24 is provided so as to be fixed to the inner circumference of the outer circumferential wall portion 20c and to face the outer circumference of the stator core 12 through a narrow gap. The magnet 24 is formed of an Nd—Fe—B (Neodymium-Ferrum-Boron) material, the surface thereof being treated with electro-deposition coating and spray coating, and the inner circumference surface side thereof being magnetized for driving in twelve poles in the circumferential direction.

Subsequently, the dynamic pressure bearing in the structure of the rotating device 100 will be described. The dynamic pressure bearing in the radial direction includes a radial dynamic pressure generating site, which is configured to include the outer circumferential surface 22c of the shaft 22, the inner circumferential surface 16a of the cylindrical portion of the sleeve 16, and the lubricant 28 such as oil, etc., that fills the gap between the two. The radial dynamic pressure generating site is formed of a plurality of individual radial dynamic pressure generating sites.

The first radial dynamic pressure generating site RB1 and the second radial dynamic pressure generating site RB2 are arranged in the gap between the inner circumferential surface 16a of the cylindrical portion and the outer circumferential surface 22c such that a dynamic pressure in the radial direction is generated to support the rotating body R. The first radial dynamic pressure generating site RB1 and the second radial dynamic pressure generating site RB2 have a first radial dynamic pressure groove and a second radial dynamic pressure groove for generating dynamic pressure on at least one of the outer circumferential surface 22c and the inner circumferential surface 16a of the cylindrical portion, which face each other.

On the other hand, the dynamic pressure bearing in the thrust direction includes the first thrust dynamic pressure generating site SB1 and the second thrust dynamic pressure generating site SB2, as shown in FIG. 2. The first thrust dynamic pressure generating site SB1 is formed by the thrust lower surface 26b of the flange portion 26e, the housing flat portion 14d, and the lubricant 28 filling the gap formed therebetween in the axial direction. The second thrust dynamic pressure generating site SB2 is formed by the thrust upper surface 26a of the flange portion 26e, the lower surface of the circular projecting portion 16b, and the lubricant 28 filling the gap formed therebetween in the axial direction.

Figure 4A:
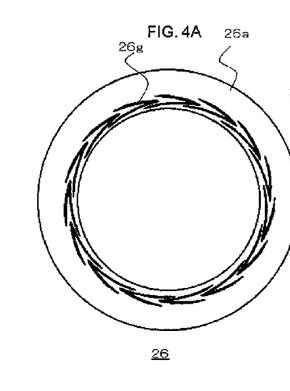
FIG. 4 is an illustrative view illustrating a thrust member of FIG. 2.
Figure 4B:
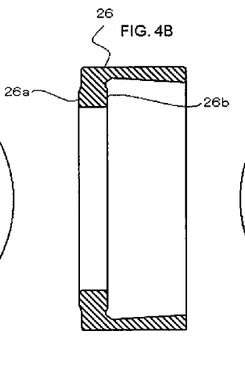
Figure 4C:
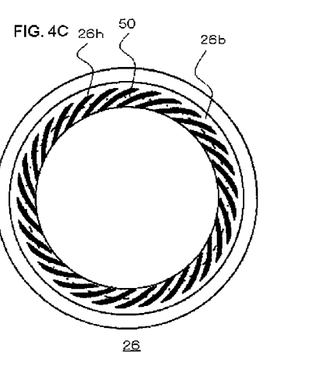

FIG. 4 is an illustrative view illustrating the thrust member 26 of FIG. 2. FIG. 4B is a sectional view along the axial direction, FIG. 4A is a top view, and FIG. 4C is a bottom view. In the first thrust dynamic pressure generating site SB1 and the second thrust dynamic pressure generating site SB2, a spiral-shaped thrust dynamic pressure pattern 26h for generating dynamic pressure is provided on the thrust lower surface 26b, and a herringbone-shaped thrust dynamic pressure pattern 26g is provided on the thrust upper surface 26a. The cross-sectional shape along the circumferential direction of a circumference 50 of the thrust dynamic pressure pattern 26h is continuously folded-back, including indentations and protrusions therebetween. An indentation is the bottom surface of an indented part, and a protrusion is a part that extends from the indentation. A protrusion and an indentation together are referred to as a step portion. With the rotation of the rotating body R, the thrust dynamic pressure generating site SB rakes up the lubricant by the edge of the protrusion so as to generate a thrust dynamic pressure. The thrust dynamic pressure as a whole becomes a pressure in a pump-in direction, which is the direction of pumping the lubricant 28 from the capillary seal portion TS to the inside of the bearing. The pressure exerts a force in the axial direction, in other words, a lifting force on the rotating body R. The lubricants 28 filled in the gaps in the first radial dynamic pressure generating site RB1, the second radial dynamic pressure generating site RB2, the first thrust dynamic pressure generating site SB1, and the second thrust dynamic pressure generating site SB2 are used in common with one another and are prevented from leaking out by being sealed with the capillary seal portion TS.

The capillary seal portion TS is configured by the outer circumferential surface 14e of the housing 14 and by the inner circumferential surface 26d of the thrust member 26. The outer circumferential surface 14e has an inclined surface, the diameter of which becoming gradually smaller when proceeding from the upper surface side to the lower surface side. On the other hand, the inner circumferential surface 26d facing thereto also has an inclined surface, the diameter of which becoming gradually smaller when proceeding from the upper surface side to the lower surface side. With such a structure, the outer circumferential surface 14e and the inner circumferential surface 26d form the capillary seal portion TS, the gap of which becoming gradually wider when proceeding from the upper surface side to the lower surface side. Herein, because an amount of the lubricant 28 to be filled in the gap is set such that the boundary surface (vapor-liquid interface) between the lubricant 28 and ambient air is located in the middle of the capillary seal portion TS, the lubricant 28 is sealed with the capillary seal portion TS by capillarity. As a result, the lubricant 28 is prevented from leaking out. In other words, the lubricant 28 fills a lubricant storing portion including, for example, the spaces forming the first radial dynamic pressure generating site RB1, the second radial dynamic pressure generating site RB2, the first thrust dynamic pressure generating site SB1, and the second thrust dynamic pressure generating site SB2, the space between the housing 14 and the thrust member 26, and the space between the circular projecting portion 16b and the hub 20. In other words, the vapor-liquid interface of the lubricant storing portion of the fluid dynamic bearing is provided in the area formed between the base member 10 and the hub 20.

As stated above, the capillary seal portion TS is designed such that the inner circumferential surface 26d thereof, an outside inclined surface thereof, has a diameter that becomes gradually smaller when proceeding from the upper surface side to the lower surface side. Thereby, with the rotation of the rotating body R, a centrifugal force in the direction where the lubricant 28 is moved toward the inside of the portion in which the lubricant is filled, is exerted on the lubricant 28, preventing, more surely, the lubricant 28 from leaking out. The communication passage I is secured by the groove 14a formed along the axial direction on the inner circumferential surface of the housing 14. Since both sides of the first radial dynamic pressure generating site RB1 and the second radial dynamic pressure generating site RB2 are communicated with each other through the communication passage I, the whole pressure balance can be maintained at a good level even if the pressure balance of the radial dynamic pressure bearing is disrupted since the balance can be quickly regained. Further, even if the balance among the dynamic pressures of the first radial dynamic pressure generating site RB1, the second radial dynamic pressure generating site RB2, and the thrust dynamic pressure generating site SB is not maintained by a disturbance such as an force from outside exerted on the shaft 22 or the rotating body R, the pressures are instantly averaged to maintain the balance. As a result, a floating amount of the rotating body R is stabilized relative to the fixed body S, allowing for the rotating device 100 to have high-reliability.

Figure 8A:
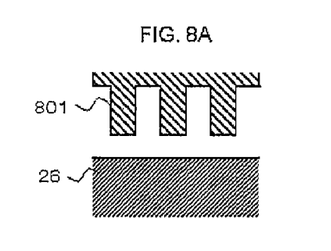
FIG. 8 is a schematic diagram illustrating a process of forming a thrust dynamic pressure pattern by a production method of a comparative example.
Figure 8B:
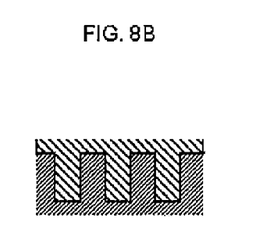
Figure 8C:
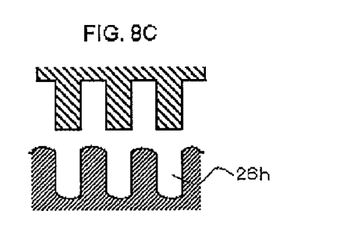

A description will now be given of a problem identified by the inventors of the present invention according to the research of a method of a comparative example. FIG. 8 is a schematic diagram illustrating a process of forming a thrust dynamic pressure pattern 26h by a production method of a comparative example. In the method of the comparative example, a die 801, which is formed to have a counter shape of the thrust dynamic pressure pattern 26h, and a rest table (not shown) are prepared. As shown in FIG. 8A, the thrust member 26 is rested at a designated position on the rest table. As shown in FIG. 8B, a pressure is then applied to the thrust member 26 by applying a pressing force on the die 801 from above. As shown in FIG. 8C, the die 801 is then opened up. The thrust member 26 is then removed from the rest table. As a result of this, the thrust member 26 is plastic deformed, forming a thrust dynamic pressure pattern 26h having an indentation corresponding to the protrusion of the die 801 and a protrusion corresponding to the indentation of the die 801. Applying the pressing force of 30-100 kN allows for the formation of the shape of the thrust dynamic pressure pattern 26h in a single application of pressure.

Figure 9:
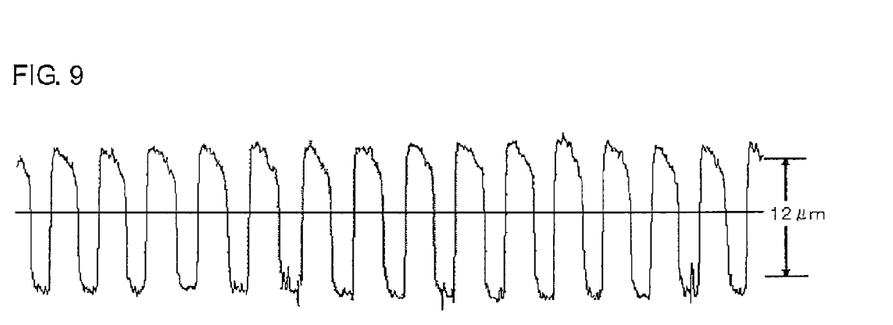
FIG. 9 is a view illustrating the cross-sectional shape, along the circumferential direction, of the thrust dynamic pressure pattern formed by the production method of the comparative example.

FIG. 9 is a view illustrating the cross-sectional shape, along the circumferential direction, of the circumference 50 of the thrust dynamic pressure pattern 26h formed by the production method of the above comparative example. In FIG. 9, the upper side represents the shape of the surface having protrusions of the step portion of the thrust dynamic pressure pattern 26h, and the lower side represents the shape of the surface inside the indentations of the step portion. The thrust dynamic pressure pattern 26h is formed by using SUS304 as the material for the thrust member 26 and by applying the pressing force of 50 kN of the die 801 so that the height of the step portion between the protrusions and the indentations becomes approximately 12 µm. FIG. 9 shows a deformation of the shape of the protrusions of the thrust dynamic pressure pattern 26h and a variation in the height of the protrusions. Burrs and flashes created by the plastic working are also found. When the pressing force of the die is reduced in order to cope with such problems, the deformation of the shape of the protrusions of the thrust dynamic pressure pattern 26h and the variation in the height of the protrusions are increased. When the pressing force is increased, the entire thrust member is deformed and becomes thin in the direction of the application of the pressure. For these reasons, the adjustment of the pressing force does not solve the problems of causing the deformation of the shape of the protrusions and the variation in the height of the protrusions.

Through a review for a cause for deformation of the shape of the protrusions of the thrust dynamic pressure pattern 26h and for the variation in the height of the protrusions, the inventors of the present invention have found the following. When the thrust dynamic pressure pattern 26h is formed on the thrust member by the plastic deformation as stated above, springback of several percent to several tens of percent of the amount of the deformation is caused. For example, when a concave-convex shape of a step portion of 12 µm is formed in a single application of pressure by plastic working, springback of about 1-5 µm is observed. The application of stress by applying pressure on a material results in the combination of the plastic deformation and the elastic deformation of the material. After the pressure is released, a part deformed due to the plastic deformation stays; however, a part deformed due to the elastic deformation returns back to its original shape, causing springback. In other words, the shape of the protrusions of the thrust dynamic pressure pattern is deformed due to the springback. Also, the hardness and the flatness of the thrust member vary depending on each part, and these variations cause a variation in the size of the springback of each part of the thrust member. In other words, when a thrust dynamic pressure pattern is formed by plastic deformation in a single application of pressure, a variation is caused in the height of the protrusions of the step portions for each part of the thrust member. In other words, in order to reduce the deformation of the shape of the protrusions of the thrust dynamic pressure pattern 26h and the variation in the height of the protrusions, suppression of the influence of the springback at the time of plastic working is a goal to be achieved.

Figure 3:
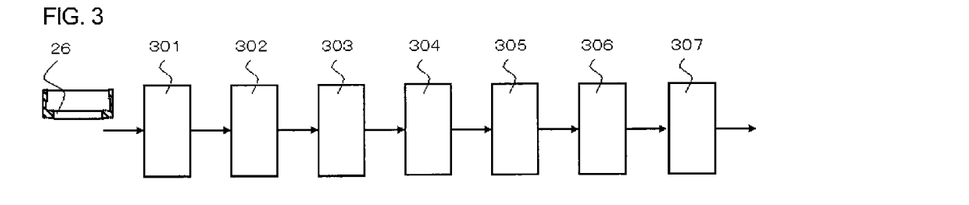
FIG. 3 is an illustrative view illustrating a production method of a rotating device 100 of the present embodiment.
Figure 5A:
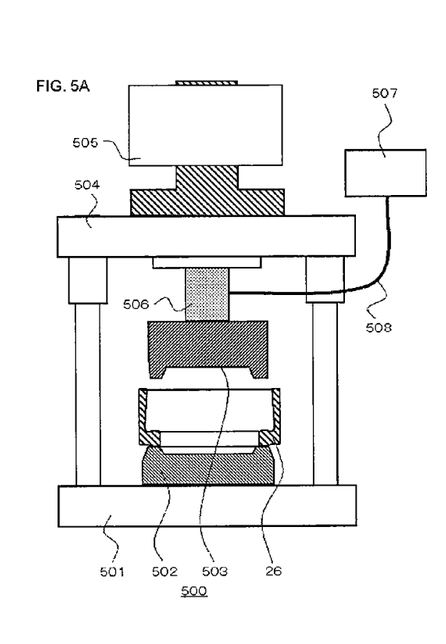
FIG. 5 is an illustrative view illustrating a dynamic pressure pattern manufacturing apparatus used in the production method of the present embodiment.
Figure 5B:
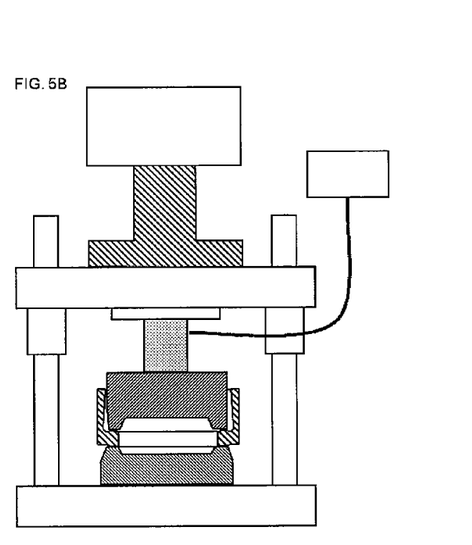
Figure 6A:
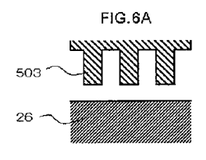
FIG. 6 is a schematic diagram illustrating a process of forming a thrust dynamic pressure pattern by the production method of the present embodiment.
Figure 6B:
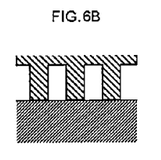
Figure 6C:
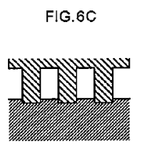
Figure 6D:
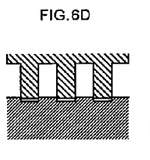
Figure 6E:
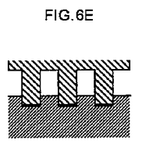
Figure 6F:
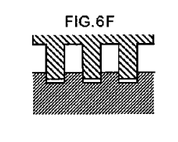
Figure 6G:
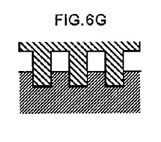
Figure 6H:
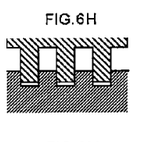
Figures 6I, 6J, 6N, 6O:
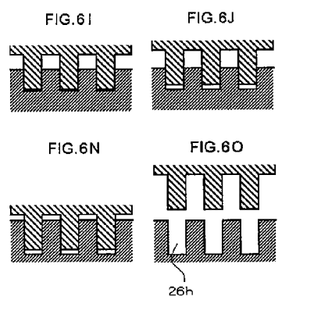
Figure 6K:
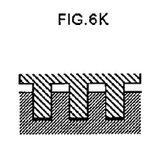
Figure 6L:
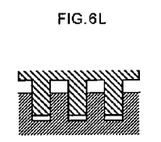
Figure 6M:
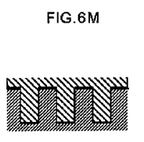

FIG. 3 is an illustrative view illustrating a production method of the rotating device 100 of the present embodiment. Details of specific processes will be described later. The processes are performed in the order shown in FIG. 3. An explanation is given of a pattern formation process 301 of forming the thrust dynamic pressure pattern 26h on the thrust member 26 in accordance with the production method of a rotating device of the present embodiment. FIG. 5 is an illustrative view illustrating a dynamic pressure pattern manufacturing apparatus 500 used in the production method of the present embodiment. The dynamic pressure pattern manufacturing apparatus 500 is configured to include a rest table 501, a first die 503, a driving device 506, a movable table 504, a supplemental-force providing means 505, a drive circuit 507, and a cable 508. The rest table 501 is configured so that the thrust member 26 rests on the rest table 501. A second die 502 is arranged in between the rest table 501 and the thrust member 26. The movable table 504 is supported such that the movable table 504 moves up and down relative to the rest table 501. For example, the movable table 504 may be configured such that the movable table 504 can move up and down guided by a supporting column fixed to the rest table 501. It is preferred in that the movable table 504 accurately moves up and down with little change in a planar positional relationship relative to the rest table 501. The first die 503 is fixed to the driving device 506, and the driving device 506 is fixed to the movable table 504. The first die 503 and the driving device 506 move up and down relative to the rest table 501 as the movable table 504 moves. The supplemental-force providing means 505 is arranged on the side of the movable table 504 opposite from the rest table 501. In addition to moving the first die 503 up and down, the supplemental-force providing means 505 also applies a supplemental force in addition to the pressing force of the driving device 506. The supplemental-force providing means 505 can move the first die 503 such that the first die 503 comes into contact with the thrust member 26 via the movable table 504 (see FIG. 5B). The supplemental-force providing means 505 applies a supplemental force, which acts on the thrust member 26, to the first die 503 via the movable table 504. The driving device 506 generates a downward pressing force at the first die 503 by an output signal of the drive circuit 507.

An explanation is now given of the operation of the supplemental-force providing means 505. The driving device 506 applies, when applying a downward pressing force to the first die 503, a force to the movable table 504 in the opposite direction due to counteraction. Without the supplemental-force providing means 505, the movable table 504, only with its mass, moves up due to counteraction and cannot fully press down the first die 503. As a result, variation can be caused in the marking of the step portions. Arranging the supplemental-force providing means 505 on the side of the movable table 504 opposite from the rest table 501 allows the first die 503 to be pressed also by the mass of the supplemental-force providing means 505. Therefore, the amount of the movable table 504 moving up due to the counteraction is reduced, allowing for the first die 503 to be fully pressed. As a result, the variation in the marking of the step portions can be reduced. As the supplemental-force providing means 505, various pressure generating apparatuses can be used. For example, a hydraulic system can be used that produces a supplemental force by oil pressure by introducing oil into an oil hydraulic cylinder. This is preferred in that the supplemental force can be easily controlled.

As the driving device 506, a pressure generating means with use of, for example, oil pressure, air pressure, or electromagnetic force can be employed. However, these driving devices come with a problem of low accuracy in amplitude of application of pressure. To cope with this, the driving device 506 may be provided with a piezoelectric element. This configuration allows for the generation of a pressing force by applying a drive voltage to the piezoelectric element. Such a driving device is preferred in that the amplitude of the application of pressure can be easily controlled so that a large pressing force is easily ensured while being small in its size.

FIG. 6 is a schematic diagram illustrating a process of forming the thrust dynamic pressure pattern 26h on the thrust member 26 of the present embodiment. In the pattern formation process 301, the dynamic pressure pattern manufacturing apparatus 500 is first prepared. The thrust member 26 to be provided with a marking is pointedly rested on the rest table 501 (FIG. 6A). The first die 503 is brought into contact with the thrust member 26 from above (FIG. 6B). While keeping this condition, pressure is applied by applying a pressing force so that the die 503 is pressed onto the thrust member 26 by the driving device 506 (FIG. 6C), and the pressing force is released after a predetermined period of time (FIG. 6D). In FIGS. 6D, 6F, 6H, 6J, 6L, and 6N, the first die 503 is drawn to be apart from the thrust member 26 for a purpose of simplifying the understanding of the state when the pressing force is released; however, in reality the first die 503 often stays in contact with the thrust member 26. An impulse is adjusted by the pressing force and the pressure time so that the amount of the plastic deformation due to the application of pressure is, for example, about 1-10 percent of the step portions desired at the end. A stroke of the die may be adjusted at the same time.

In the pattern formation process 301, the pressing force and the time for applying the pressing force are set after adjusting the pressing force and the time so that the step portions marked in a single cycle of pressuring operation are smaller than those of the thrust dynamic pressure pattern 26h. In other words, the impulse applied to the member to be marked by the die is adjusted so as to control the amount of deformation of the plastic. Reducing the amount of the plastic deformation to have about 1 to 10 percent of the step portions desired in the end allows the amount of the springback to be from one tenth to one hundredth of that of the comparative example. Repeating the operation of applying the pressing force and then releasing the pressing force after the predetermined period of time as described above, the operation being one cycle, allows the thrust member to receive the impulse in small steps and gradually plastic-deformed (FIGS. 6E-6N). Since the time for releasing the pressing force is provided in the cycle so that a pressing force is applied after the springback that occurs during the time period, the amount of the springback is rarely accumulated. As described above, the thrust dynamic pressure pattern is gradually formed by consecutively repeating the cycle, which includes pressuring operation and the releasing operation of releasing the pressing force, for multiple times, and the desired thrust dynamic pressure pattern is formed at the end by controlling the effect of the springback.

Figure 7:
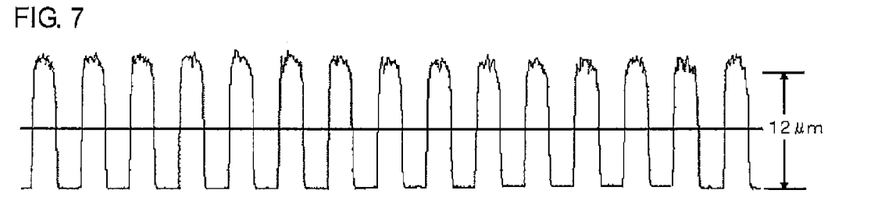
FIG. 7 is a view illustrating the cross-sectional shape, along the circumferential direction, of the thrust dynamic pressure pattern formed by the production method of the present embodiment.

FIG. 7 is a view illustrating the measurement of the cross-sectional shape, along the circumferential direction, of the circumference 50 of the thrust dynamic pressure pattern 26h formed by the production method of the present embodiment. In FIG. 7, the upper side represents the shape of the surface having protrusions of the step portion of the thrust dynamic pressure pattern 26h, and the lower side represents the shape of the surface inside the indentations of the step portion. The thrust dynamic pressure pattern 26h is formed by using SUS304 as the material for the thrust member 26 and by applying the pressing force of 1 kN of the driving device 506, with the number of cycles to be repeated being fifty and both the pressure time and the releasing time being 0.01 second, so that the height of the step portion between the protrusions and the indentations becomes approximately 12 µm. In the present embodiment of FIG. 7, the deformation of the shape deep inside of the indentations of the step portions is smaller than that of the shape of the protrusions on the surface. Compared to the cross-sectional shape shown in FIG. 9, the deformation of the shape of the protrusions on the surface of the thrust dynamic pressure pattern 26h and the deformation of the shape deep inside of the indentations are small, and it is shown that steep edges are obtained and that a variation in the height of the protrusions is small. A processing condition for obtaining the required shape of the step portions of the thrust dynamic pressure pattern 26h can be obtained by experiments by using the above pressing force, the pressure time, the releasing time, and the number of cycles to be repeated as parameters. Burrs and flashes are smaller compared to those of the comparative example, and a possibility of a failure due to the burrs and flashes coming off and getting stuck in the gap of the bearing during the rotation is thus reduced. Also, since the pressing force is small, a change of the shape over time due to residual stress is reduced, and the reliability of the rotating device is enhanced.

When the surface roughness of the indentations of the step portions is large, a foreign particle can attach to the thrust dynamic pressure pattern 26h during the process after the pattern is formed. In this case, foreign particles are easily attached but are hard to remove when the surface roughness of surface having the indentations is large. Also, compared to foreign particles attached to the protrusions, foreign particles attached to the indentations are harder to be removed and more likely to stay. The foreign particles staying on the protrusions can have adverse effects on the performance or the lifetime of the rotating device 100. To cope with this, the thrust dynamic pressure pattern 26h may be configured so that the surface roughness of the indentations of the step portions is smaller than that of the protrusions of the step portions. This is advantageous in that the effect on the performance or the lifetime of the rotating device 100 is reduced. For example, the surface roughness of the indentations may be ensured to be at most Ry 0.8 µm, and it has been confirmed that there is almost no effect on the performance or the lifetime of the rotating device 100 in practical use. Also, the surface roughness of the indentations may be ensured to be at most Ry 0.4 µm. It is preferred in that the reliability of the rotating device 100 is further enhanced.

Reducing the surface roughness of the protrusions of the first die 503 is effective for reducing the surface roughness of the indentations of the step portions. For example, polishing the surface of the first die 503 allows the surface roughness to become Ry 0.2 µm or less. A processing condition for obtaining predetermined surface roughness of the thrust dynamic pressure pattern 26h can be obtained by experiment by using the above surface roughness of the protrusions of the first die 503, pressing force, the pressure time, the releasing time, and the number of cycles to be repeated as parameters.

During the above pattern formation process, the contact between the thrust member 26 and the first die 503 can become unstable. Therefore, during the above pattern formation process, a constant supplemental force that is smaller than the pressing force toward the thrust member 26 can be further applied, in addition to the pressing force, to the components between the supplemental-force providing means 505 and the first die 503.

When the supplemental force is too small, there arises a problem that the state of the contact between the thrust member 26 and the first die 503 becomes unstable during the pattern formation process. To cope with this, a supplemental force may be applied that is large enough for the first die 503 to maintain the state of the contact with the thrust member 26 to be marked. For example, the supplemental force may be set to be at least 50 N. The problem, where the contact between the thrust member 26 and the first die 503 becomes unstable during the pattern formation process, can be minimized. When the supplemental force is too large, there arises a problem that the thrust member 26 is deformed in a compressed manner. To cope with this, the supplemental force may be set to be much smaller than the above-stated pressing force. This is advantageous in that the deformation of the thrust member 26 can be suppressed. The supplemental force may be set to be smaller than a force that can cause a deformation of the thrust member 26 and to be in the range where the form of the thrust member 26 is maintained. In other words, the pattern formation process can be performed while the size of the supplemental force is set to be in the range where the form of the thrust member 26 is prevented from being changed. Preventing the form from being changed means preventing plastic deformation. For example, the supplemental force may be set to be at most 500 N. This is further preferred in that the deformation of the thrust member 26 can be suppressed.

When the amplitude of the pressure application of the driving device 506 is set to be large or when the pressing force of the driving device 506 is set to be large, the entire thrust member 26 can be deformed in a compressed manner in the direction of the application of the pressure. A processing condition for preventing the deformation such that the entire thrust member 26 is deformed in a squashed manner in the direction of the application of the pressure can be obtained by experiment by using the size and the amplitude of the pressing force of the driving device 506 as parameters. It has been confirmed that, when the amplitude of the pressure application of the driving device 506 is at most five times more than the step portions of the thrust dynamic pressure pattern 26h and when the pressing force of the driving device 506 is set to be at most 10 kN, deformation can be minimized to the degree that the deformation is not considered a problem in practical use. When the amplitude of the pressure application of the driving device 506 is small or when the pressing force is small, the amount of the plastic deformation in one cycle is small, and the number of cycles to be repeated thus becomes large in order to obtain the desired form. When the number of cycles to be repeated becomes larger, the processing time also becomes longer, reducing the workability. When the amplitude of the pressure application of the driving device 506 is at least 0.5 times the step portions of the thrust dynamic pressure pattern 26h and when the pressing force of the driving device 506 is set to be at least 0.1 kN, the reduction in the workability can be minimized to the degree that it is not considered a problem in practical use. It is advantageous in that, when the amplitude of the pressure application of the driving device 506 is in the range of 1-2 times the step portions of the thrust dynamic pressure pattern 26h and when the pressing force of the driving device 506 is set to be 0.5-5 kN, good workability can be ensured while minimizing the deformation.

There is a goal of reducing a loss resistance at the time of rotation of the thrust dynamic pressure pattern 26h. For this goal to be achieved, it is effective to form the step portions of the thrust dynamic pressure pattern 26h to be a predetermined shape. For this, it is important to reduce the variation in the shape of the marked step portions of the thrust member 26 and to reduce the surface roughness of the indentations of the step portions. On the other hand, when the pressure time in one cycle during the pattern formation process is shortened, the impulse applied to the thrust member becomes small. Thus, insufficient deformation is caused by the effect of the springback, and the variation in the shape of the step portions becomes large. It has been also confirmed that, when the time in which the first die stays in contact with the thrust member 26 is short, the surface roughness of the indentations of the marked step portions tends to be large. To cope with this, a condition of the pattern formation process for forming the step portions of the thrust dynamic pressure pattern 26h to be a predetermined desired shape can be obtained by experiment by using the time in which the first die stays in contact with the thrust member 26 and the pressure time in one cycle as parameters. For example, the pattern formation process can be performed with a time of at least three seconds, in which the first die stays in contact with the thrust member 26, and with a pressure time in one cycle in a range of at least 0.001 second. It is advantageous in that the variation in the shape of the step portions is reduced and in that the surface roughness of the indentations of the step portions is reduced. This is preferred in that the variation in the surface roughness of the indentations of the step portions can be reduced by setting the time, in which the first die stays in contact with the thrust member 26, to be at least five seconds. When the first die stays in contact with the thrust member 26 or the pressure time in one cycle is increased, the processing time for obtaining the desired shape becomes longer, reducing the workability. Therefore, the pattern formation process can be performed with a time of at most 20 seconds, in which the first die stays in contact with the thrust member 26, and with a pressure time in one cycle in a range of at most 0.1 second. This is preferred in that the reduction in the workability can be prevented.

When the time for releasing the pressing force is short, springback in one cycle becomes insufficient due to the inertia of the die. Therefore, the springback is accumulated such as to cause deformation of the shape of the protrusions of the thrust dynamic pressure pattern and variation in the height of the protrusions. Setting the releasing time in one cycle to be at least 0.001 second is advantageous in that the deformation or the variation can be prevented. When the releasing time becomes longer, the processing time for obtaining the desired shape also becomes longer, reducing the workability. Setting the releasing time in one cycle to be at most 0.1 second is advantageous in that the reduction in the workability can be prevented.

When the number of the cycles to be repeated is small, springback in one cycle becomes large. Therefore, it causes the deformation of the shape of the protrusions of the thrust dynamic pressure pattern and the variation in the height of the protrusions due to the springback. Setting the number of cycles to be repeated to be at least 10 is advantageous in that such deformation of the shape or the variation in the height of the protrusions can be prevented. When the number of cycles to be repeated becomes larger, the processing time becomes longer, reducing the workability. Setting the number of cycles to be repeated to be at most 1000 is advantageous in that the reduction in the workability can be prevented. Setting the number of cycles to be repeated to be 20-200 is further advantageous in that good workability can be ensured while the deformation of the shape or the variation in the height of the protrusions is prevented.

The thrust member 26 is then removed from the rest table, and the step is moved to a bun-like part removing process 302. On the surface of the protrusions or the indentations of the thrust dynamic pressure pattern 26h of the thrust member 26, parts that look like a burrs (hereinafter, referred to as a "bun-like part"), which are parts that are not completely separated and are barely connected to the surface, are left sometimes. The bun-like part includes at least one burr. When such the thrust member 26 is incorporated in the rotating device 100, the dynamic pressure of the lubricant is applied to the bun-like part, and the bun-like part will eventually be broken and separated by metallic fatigue from receiving stress repeatedly. When the separated part is stuck in a bearing gap, the bearing can be damaged, and, in the worst case, the separated part can cause rotation failure. In other words, there is a problem that the lifetime of the rotating device 100 is limited due to the bun-like part. To cope with this, a process of peeling off and removing the bun-like part, which is barely connected to the surface of the thrust member 26 on which the step portions are marked, may be included after the pattern formation process. In other words, a property of stress resistance can be ensured by peeling off and removing, in advance, a part such as a burr that is weakly connected to the surface of the thrust dynamic pressure pattern 26h.

As the process of peeling off and removing the bun-like part, for example, a method of applying impact or an alternating vibration on the bun-like part after the marking of the step portions so as to break and separate the bun-like part by metallic fatigue can be used. This method is advantageous in that burr-like parts that can affect the lifetime can be effectively removed. Bun-like parts that do not separate and that stay after receiving impact or the alternating vibration are less likely to be separated even when the dynamic pressure of the lubricant is applied in future. A condition for removing those burr-like parts that can affect the lifetime can be determined by experiment by using, as parameters, the frequency and the amplitude of the alternating vibration, which is to be applied to the burr-like parts, and the time for the application thereof so as to ensure the property of resisting the stress affecting the predetermined lifetime of the rotating device 100. For example, a method of applying impact or an alternating vibration directly on the bun-like part using a powder, a liquid, or a gas as a medium is advantageous in that the burr-like part can be efficiently removed. A method of applying impact or an alternating vibration indirectly on the burr-like part can be used by applying impact or an alternating vibration on the thrust member 26 on which the step portions are marked. Since a medium is not used, this method is advantageous in that the effort for the work is not necessary.

When a foreign particle such as press oil or a separated burr-like part is attached to the thrust member 26, the foreign particle is removed. For example, the thrust member 26 may be washed by soaking the thrust member 26 in a washing solution. As a result, the problem that the lifetime of the rotating device is limited due to the burr-like part can be reduced.

The thrust member then undergoes a first examination process 303. In the first examination process 303, the step portions of the thrust dynamic pressure pattern 26h marked on the thrust member 26 are examined. In other words, the deformation of the shape of the protrusions of the thrust dynamic pressure pattern 26h and the variation in the height of the protrusions are compared with pre-set references. This is advantageous in that a defective one can be removed even when a defective thrust dynamic pressure pattern 26h is produced in the above process. For example, a toolmaker's microscope or a form measuring instrument can be used for this examination.

When the surface roughness of the surface deep inside the step portions that are the indentations and the surface roughness of the surface that are the protrusions of the step portions of the thrust dynamic pressure pattern 26h of the thrust member 26 on which the step portions are marked are large, a loss due to the resistance at the time of rotation of the thrust dynamic pressure pattern 26h can be increased. If the surface roughness is large when the thrust member 26 comes into contact with an opposing part of the fixed body during low-speed rotation at the time of startup or stoppage, the surface of the opposing part of the fixed body can be damaged and the so-called lifetime for startup or stoppage can be shortened. To cope with this, a process may be further included that measures at least either the surface roughness of the indentations of the step portions of the thrust dynamic pressure pattern 26h of the thrust member 27 or the surface roughness of the protrusions of the step portions of the thrust dynamic pressure pattern 26h. Such surface roughness can be measured along the circumferential direction. More specifically, when the measured surface roughness is larger than a predetermined reference value, the thrust member 26 is determined not to meet the standard. The thrust member 26 determined not to meet the standard is removed. For example, the predetermined reference value may be set to be Ry 1.6 μm. It has been confirmed that a loss due to the resistance at the time of rotation of the thrust dynamic pressure pattern 26h of the thrust member 26 examined by using the reference value does not cause a problem in practical use. The predetermined reference value may be set to be Ry 0.8 μm. It has been confirmed that the lifetime for startup or stoppage of the thrust member 26 examined by using the reference value does not cause a problem in practical use.

As a method of measuring the surface roughness of the step portions of the thrust dynamic pressure pattern 26h, for example, a method of measuring the surface roughness by sliding a needle-like contact on the step portions of the thrust dynamic pressure pattern 26h can be used. However, a burr-like part may be created on the step portions of the thrust dynamic pressure pattern 26h by sliding the contact. When the bun-like particle is separated and gets stuck in the bearing gap after the thrust member 26 is incorporated in the rotating device 100, the lifetime of the rotating device 100 can be limited. To cope with this, a method of measuring the surface roughness by irradiating the step portions of the thrust dynamic pressure pattern 26h with a laser beam and then detecting a reflected light thereof with use of a sensor, in accordance with the output signal of the reflected light. The problem that the lifetime of the rotating device is limited can be reduced. In this case, the measurement may be taken while rotating the thrust member 26. This is preferred in that the surface roughness of the entire thrust member 26 along the circumferential direction can be measured.

The thrust member 26 then undergoes a bearing unit assembling process 304. In the bearing unit assembling process 304, the thrust member 26 is incorporated in the bearing unit. Further, the lubricant is injected in the bearing unit.

The thrust member then undergoes a rotating device assembling process 305. In the rotating device assembling process 305, the bearing unit is incorporated in the rotating device.

The rotating device then undergoes an aging treatment process 306. The thrust member 26 on which the thrust dynamic pressure pattern 26h is formed can have a stress strain left on the processes part thereof. Long time use of a rotating device in which such a thrust member is incorporated can result in a deformation with age where the strain is removed such that the thrust dynamic pressure pattern 26h deforms slightly. When the thrust dynamic pressure pattern 26h deforms, there is a possibility that a desired thrust dynamic pressure is not generated and, in the worst case, that the rotation of the rotating device goes wrong shorting the lifetime of the rotating device. For this reason, it is ensured to perform an aging treatment on the rotating device in which the thrust member is incorporated. For example, the rotating device can be left in a high-temperature chamber of 80-90 degrees Celsius that is filled with purified air for 60-120 minutes. The stress strain is removed by the aging treatment in an accelerated manner.

The rotating device 100 then undergoes a second examination process 307. In the second examination process 307, the height of the rotating body relative to the fixed body is checked for the rotating device 100 on which the treatment is again performed so as to remove a defective rotating device. The problem that the lifetime of the rotating device 100 is shortened due to the stress strain of the thrust dynamic pressure pattern 26h can be reduced. The second examination process 307 includes a first measuring process, a second measuring process, and a removing process. In the first measuring process, a first height h1 of the rotating body relative to the fixed body in the direction of the rotating axis when the rotating device 100 is not rotating. In the second measuring process, a second height h2 of the rotating body relative to the fixed body in the direction of the rotating axis when the rotating device 100 is rotating at a predetermined speed. The predetermined speed may be set to be, for example, 5400 (r/m). Since the thrust dynamic pressure pattern 26h generates dynamic pressure in the lubricant 28 in the thrust direction due to the rotation of the rotating body, the rotating body moves up, increasing the second height h2.

In the removing process, the rotating device 100 on which the aging treatment is performed is examined based on the measured first height h1 and the measured second height h2. More specifically, when the difference between the first height h1 and the second height h2 is not in a predetermined reference range, the rotating device 100 is determined not to meet the standard. The rotating device 100 determined not to meet the standard is removed. When the difference (h2-h1) between the first height h1 and the second height h2 of the rotating device 100 is too small, a possibility of a part of the rotating body and a part of the fixed body coming into contact with each other due to insufficient floating becomes high when the viscosity of the lubricant 28 becomes low in a high-temperature environment. Therefore, for example, when the difference (h2-h1) between the first height h1 and the second height h2 of the rotating device 100 is less than 5 μm, the rotating device 100 may be removed as a defective rotating device. When the difference (h2-h1) between the first height h1 and the second height h2 of the rotating device 100 is too large, a possibility of a part of the rotating body and a part of the fixed body coming into contact with each other due to excessive floating becomes high when the viscosity of the lubricant 28 becomes high in a low-temperature environment. To cope with this, for example, when the difference (h2-h1) between the first height h1 and the second height h2 of the rotating device 100 is over 15 μm, the rotating device 100 may be removed as a defective rotating device. As a result, this is advantageous in that the range of temperature in which the rotating device 100 can be used is increased.

The hardness of the metal material that forms the thrust member 26 can vary for each manufacturing lot of the base material thereof. When the hardness of the base material varies, a processing condition for processing with desired accuracy also varies. Therefore, a test-forming process is often added in order to obtain the optimal processing condition for each base material, and the production efficiency is therefore decreased because of the addition of the test-forming process. The variation in the shape of the protrusions of the thrust dynamic pressure pattern 26h increases, and the variation in the dynamic pressure also increases. To cope with this, a process of performing a heat treatment on the base material of the thrust member 26 may be further included before the marking process in order to stabilize the hardness of the thrust member 26. For example, the hardness is stabilized by performing the heat treatment of leaving the base member of the thrust member 26 to stand still in the atmosphere of 800-1100 degrees Celsius for 60-180 minutes and heating and then rapidly cooling the base material. As a result, almost no test-forming process in order to obtain the optimal processing condition for each base material is required. The problem that the variation in the dynamic pressure is increased due to the variation in the hardness of the base material is reduced.

The pressure time and the time for releasing the pressing force can be set separately. When the pressure time and the time for releasing the pressing force are different, a signal for driving the driving device 506 becomes complicated. There is a problem that the size of the drive circuit 507 becomes larger in order to generate such a complicated signal. To cope with this, a configuration may be employed where the time for releasing the pressing force and the pressure time are almost the same. As a result, the driving device 506 can be driven by a simple alternating-current signal, and the above-stated problem is thus reduced. The condition where "the time for releasing the pressing force and the pressure time are almost the same" includes that case where a slight time difference is caused due to a difference or the like in the electrical characteristics of the drive circuit or the mechanical characteristics of the device.

In forming the thrust dynamic pressure patterns 26g and 26h on both sides of the thrust member, there is a method of forming the thrust dynamic pressure patterns in separate processes. However, this method comes with a problem that a pattern formed first is deformed when a subsequent pattern in formed. To cope with this, the pattern formation process may be performed by further arranging the second die 502 in between the rest table 501 and the thrust member 26. As a result, the thrust dynamic pressure patterns 26g and 26h are formed on both sides of the thrust member 26, and the above-mentioned deformation can thus be reduced.

In this case, the step portions of the indentations and the protrusions that correspond to the thrust dynamic pressure pattern 26g of the second die 502 can be designed to be different from the step portions of the indentations and the protrusions that correspond to the thrust dynamic pressure pattern 26h of the first die. This is preferred in that the optimal step portions can be formed that correspond to the dynamic pressure for each of the thrust dynamic pressure patterns 26g and 26h.

Further, when the flatness of the thrust member is to be improved, a process of evening out and flattening the surface of the thrust dynamic pressure pattern 26h of the thrust member 26 may be further included after the pattern formation process. For example, press working can be performed by a planar-shaped die.

When the rotating device of the present embodiment is to be a disk drive device, the rotating device may be further provided with a hub on which a recording disk is to be mounted, and the thrust member may be formed integrally with the hub. In this case, a thrust dynamic pressure pattern is formed by using the thrust member formed integrally with the hub as the member to be marked. Compared to when the thrust member and the hub are separately configured, this saves the efforts for the assembly and is advantageous in thinning the disk drive device.

In the above-mentioned explanation of the present embodiment, the description is given by using the thrust member 26, which is a rotating member, as the member to be marked. However, the same applies to a case where a thrust dynamic pressure pattern is formed by using the sleeve 16, which is a fixed member, as the member to be marked.

In the embodiment, the rotating device, which is a brushless motor that is mounted on a hard disk drive device and that drives a recording disk, is described. However, the rotating device is not limited to this. For example, the rotating device may be a disk drive motor or the like mounted on an optical disk recording and reproducing device such as a CD (Compact Disc) device or a DVD (Digital Versatile Disc) device.

The present invention should not be limited to each of the aforementioned embodiments, and various modifications such as design modifications, can be made with respect to the above embodiments based on the knowledge of those skilled in the art. The structure illustrated in each drawing is intended to exemplify an example, and the structure can be appropriately modified to a structure having a similar function, which can provide similar effects.

What is claimed is:

1. A production method of a rotating device having:
  a fixed body;

a rotating body supported rotatably around a rotating axis;
a fixed member fixed to the fixed body;
a rotating member fixed to the rotating body so as to surround the rotating axis, facing the fixed member in the axial direction; and
a thrust dynamic pressure generating site provided with a thrust dynamic pressure pattern formed on at least either a part of the end surface of the rotating member or a part of the end surface of the fixed member, which face the axial direction, wherein the production method comprises:
setting either the rotating member or the fixed member in the manufacturing apparatus as a member to be marked by using a manufacturing apparatus provided with,
a rest table,
a movable table supported such that the movable table can move up and down relative to the rest table,
a driving device arranged on the rest table side of the movable table and configured to generate a pressing force,
a drive circuit configured to output a output signal to the driving device,
a supplemental-force providing means arranged on the side opposite from the rest table side of the movable table and configured to provide a supplemental force, separate from the pressing force, to the movable table, and
a first die arranged in between the driving device and the rest table;
bringing the member to be marked and the first die into contact with each other;
forming the thrust dynamic pressure pattern gradually by consecutively repeating a cycle for a plurality of times, which includes a pressuring operation of marking a step portion on the member to be marked by applying the pressing force on the member to be marked through the first die and a releasing operation of releasing the pressing force thereafter; and
incorporating the member to be marked in the rotating device, wherein
the thrust dynamic pressure pattern is formed while applying the supplemental force, separate from the pressing force, which is small enough to prevent the shape of the member to be marked from being changed but large enough to maintain the state of contact of the first die with the member to be marked.

2. The production method of a rotating device according to claim 1, wherein the supplemental force is at least 50 N and at most 500 N.

3. The production method of a rotating device according to claim 1, wherein the pressing force is set to be 0.1-10 kN in forming the thrust dynamic pressure pattern.

4. The production method of a rotating device according to claim 1, wherein the thrust dynamic pressure pattern is formed with a time period of 3 to 20 seconds, in which the first die stays in contact with the member to be marked, and with a pressure time in each said cycle in a range of 0.001-0.1 second.

5. The production method of a rotating device according to claim 1 further comprising, after the thrust dynamic pressure pattern is formed, peeling off and removing a part, which is weakly connected to the surface of the member to be marked, on which a step portion is marked.

6. The production method of a rotating device according to claim 1 further comprising, after the thrust dynamic pressure pattern is formed, measuring at least either the surface roughness of an indentation of the step portion of the thrust dynamic pressure pattern of the member to be marked or the surface roughness of a protrusion of the step portion of the thrust dynamic pressure pattern.

7. The production method of a rotating device according to claim 1 further comprising:
performing an aging treatment on the rotating device;
measuring a first height of the rotating body relative to the fixed body in the direction of the rotating axis when the rotating device on which the aging treatment is performed is not rotating;
measuring a second height of the rotating body relative to the fixed body in the direction of the rotating axis when the rotating device on which the aging treatment is performed is rotating; and
examining the rotating device on which the aging treatment is performed based on the measured first height and the measured second height.

8. The production method of a rotating device according to claim 1, wherein the thrust dynamic pressure pattern is formed, further arranging a second die on the side of the member to be marked opposite from the first die side.

9. The production method of a rotating device according to claim 1 further comprising washing out the surface of the member to be marked.

10. The production method of a rotating device according to claim 9, wherein an ultrasonic wave is applied via a liquid on the surface of the member to be marked so as to clean out the surface in washing out the surface of the member to be marked.

11. The production method of a rotating device according to claim 1, wherein the pressing force and a time for applying the pressing force are set after adjusting the pressing force and the time so that the step portion marked in one said cycle of the pressuring operation is smaller than that of the thrust dynamic pressure pattern in forming the thrust dynamic pressure pattern.

12. The production method of a rotating device according to claim 1, wherein the thrust dynamic pressure pattern is formed by repeating the cycle for at least ten times in forming the thrust dynamic pressure pattern.

13. The production method of a rotating device according to claim 1, wherein the number of the cycles is set to be at most 1000 in forming the thrust dynamic pressure pattern.

14. The production method of a rotating device according to claim 1 further comprising performing a heat treatment by heating and then rapidly cooling the member to be marked before setting the member to be marked in the manufacturing apparatus.

15. The production method of a rotating device according to claim 1 further comprising examining whether the step portion of the thrust dynamic pressure pattern has a predetermined shape.

16. The production method of a rotating device according to claim 1 further comprising performing an aging treatment on the rotating device and a subsequently examining whether dynamic pressure generated by the thrust dynamic pressure pattern has predetermined performance.

17. The production method of a rotating device according to claim 1, wherein the time for releasing the pressing force is almost the same as the time for applying the pressing force in forming the thrust dynamic pressure pattern.

18. A production method of a rotating device having:
a fixed body;
a rotating body supported rotatably around a rotating axis;
a fixed member fixed to the fixed body;

a rotating member fixed to the rotating body so as to surround the rotating axis, facing the fixed member in the axial direction; and a thrust dynamic pressure generating site provided with a thrust dynamic pressure pattern formed on at least either a part of the end surface of the rotating member or a part of the end surface of the fixed member, which face the axial direction, wherein the production method comprises:

setting either the rotating member or the fixed member in the manufacturing apparatus as a member to be marked by using a manufacturing apparatus provided with, a rest table, a movable table supported such that the movable table can move up and down relative to the rest table, a driving device arranged on the movable table and configured to generate a pressing force, a supplemental-force providing means arranged on the movable table and configured to provide a supplemental force, separate from the pressing force, to the movable table, and a first die arranged in between the driving device and the rest table;

bringing the member to be marked and the first die into contact with each other;

forming the thrust dynamic pressure pattern gradually by consecutively repeating a cycle for a plurality of times, which includes a pressuring operation of marking a step portion on the member to be marked by applying the pressing force on the first die and the member to be marked and a releasing operation of releasing the pressing force thereafter; and incorporating the member to be marked in the rotating device, wherein the thrust dynamic pressure pattern is formed while applying the supplemental force, separate from the pressing force, which is large enough to maintain the state of contact of the first die with the member to be marked.

19. The production method of a rotating device according to claim 18, wherein the supplemental force is at least 50 N and at most 500 N.

20. A rotating device produced by the production method according to claim 18, wherein the surface roughness of an indentation of a step portion is smaller than the surface roughness of a protrusion of the step portion in the thrust dynamic pressure pattern.

* * * * *